United States Patent
Balduin et al.

(10) Patent No.: US 10,562,803 B2
(45) Date of Patent: Feb. 18, 2020

(54) TOOL FOR A GLASS-BENDING PROCESS

(71) Applicant: SAINT-GOBAIN GLASS FRANCE, Courbevoie (FR)

(72) Inventors: Michael Balduin, Alsdorf (DE); Jean-Marie Le Ny, Lima (PE); Guenther Schall, Kreuzau (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 351 days.

(21) Appl. No.: 15/328,475

(22) PCT Filed: Sep. 8, 2015

(86) PCT No.: PCT/EP2015/070430
§ 371 (c)(1),
(2) Date: Jan. 23, 2017

(87) PCT Pub. No.: WO2016/066309
PCT Pub. Date: May 6, 2016

(65) Prior Publication Data
US 2017/0217820 A1    Aug. 3, 2017

(30) Foreign Application Priority Data

Oct. 28, 2014    (EA) .................................... 14190619

(51) Int. Cl.
*C03B 23/00* (2006.01)
*C03B 23/02* (2006.01)
(Continued)

(52) U.S. Cl.
CPC ........ *C03B 35/145* (2013.01); *C03B 23/0252* (2013.01); *C03B 23/0302* (2013.01); *C03B 23/0357* (2013.01)

(58) Field of Classification Search
CPC . C03B 23/0357; C03B 35/207; C03B 35/145; C03B 23/03; C03B 2225/02; C03B 23/0302; C03B 23/023; C03B 23/0307
See application file for complete search history.

(56) References Cited

U.S. PATENT DOCUMENTS

| 3,778,244 A | 12/1973 | Nedelec et al. |
| 4,229,199 A | 10/1980 | Seymour |

(Continued)

FOREIGN PATENT DOCUMENTS

| CN | 1518524 A | 8/2004 |
| CN | 1531510 A | 9/2004 |

(Continued)

OTHER PUBLICATIONS

Restriction Requirement for U.S. Appl. No. 15/328,471, filed Jan. 23, 2017, on behalf of Saint-Gobain Glass France, dated Aug. 30, 2018. 7 pgs.

(Continued)

*Primary Examiner* — Jodi C Franklin
(74) *Attorney, Agent, or Firm* — Pillsbury Winthrop Shaw Pittman LLP

(57) ABSTRACT

A tool for holding at least one glass pane by means of suction in a bending process, comprising a frame-like, convex contact surface and a cover having a peripheral air guide plate that surrounds the contact surface at least in regions is described. The tool is suitable for generating a first, reduced pressure in a first pressure region between the air guide plate and the contact surface; a second pressure in a second pressure region, which is arranged in a central region inside the contact surface, wherein the second pressure is greater than the first pressure.

17 Claims, 4 Drawing Sheets

Figure 1:
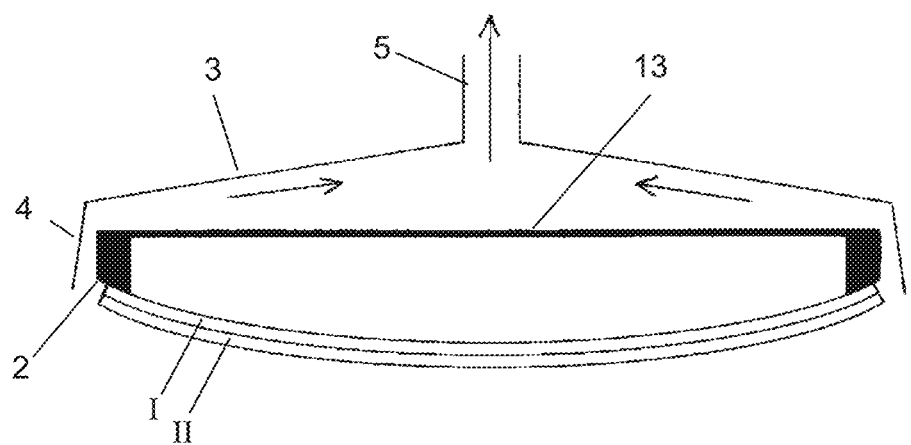

(51) Int. Cl.
*C03B 35/14* (2006.01)
*C03B 23/025* (2006.01)
*C03B 23/03* (2006.01)
*C03B 23/035* (2006.01)

(56) References Cited

U.S. PATENT DOCUMENTS

| | | | |
|---|---|---|---|
| 4,511,386 A * | 4/1985 | Kellar | C03B 35/145 |
| | | | 294/188 |
| 4,678,495 A * | 7/1987 | Yoshizawa | C03B 23/023 |
| | | | 65/106 |
| 4,877,437 A | 10/1989 | Nitschke | |
| 5,669,952 A * | 9/1997 | Claassen | C03B 23/0252 |
| | | | 65/106 |
| 5,833,729 A | 11/1998 | Meunier | |
| 6,138,477 A | 10/2000 | Morin | |
| 6,318,125 B1 | 11/2001 | Diederen et al. | |
| 6,668,589 B1 * | 12/2003 | Mizusugi | C03B 23/0357 |
| | | | 65/106 |
| 8,746,011 B2 | 6/2014 | Balduin et al. | |
| 8,978,418 B2 | 3/2015 | Baldiun et al. | |
| 9,452,662 B2 | 9/2016 | Baldiun et al. | |
| 2003/0182969 A1 * | 10/2003 | Dunifon | C03B 23/03 |
| | | | 65/323 |
| 2004/0107729 A1 * | 6/2004 | Fukami | C03B 23/0258 |
| | | | 65/25.4 |
| 2007/0157671 A1 | 7/2007 | Thellier et al. | |
| 2008/0134722 A1 | 6/2008 | Balduin et al. | |
| 2010/0236290 A1 * | 9/2010 | Fukami | C03B 23/0252 |
| | | | 65/106 |
| 2014/0011000 A1 | 1/2014 | Dunkmann et al. | |
| 2017/0210663 A1 | 7/2017 | Balduin et al. | |

FOREIGN PATENT DOCUMENTS

| | | |
|---|---|---|
| CN | 2641043 Y | 9/2004 |
| CN | 1651345 A | 8/2005 |
| CN | 1764607 A | 4/2006 |
| DE | 101 05 200 A1 | 8/2002 |
| EP | 0613865 A1 | 9/1994 |
| EP | 0706978 A2 | 4/1996 |
| EP | 1836136 B1 | 5/2011 |
| JP | S49-110710 A | 10/1974 |
| JP | S52-43855 B1 | 11/1977 |
| JP | S63-027443 U | 2/1988 |
| JP | H03-504003 A | 9/1991 |
| JP | H06-256030 A | 9/1994 |
| JP | H08-183626 A | 7/1996 |
| JP | 2002-527349 A | 8/2002 |
| JP | 2008-526659 A | 7/2008 |
| JP | 2014-504229 A | 2/2014 |
| KR | 2014-0019312 A | 2/2014 |
| WO | 2006/072721 A1 | 7/2006 |
| WO | 2012/080071 A1 | 6/2012 |
| WO | 2012/080072 A1 | 6/2012 |

OTHER PUBLICATIONS

International Search Report for International Application No. PCT/EP2015/070432 filed on Sep. 8, 2015 in the name of Saint-Gobain Glass France. (English translation and German original) dated Jul. 12, 2015.

International Search Report for International Application No. PCT/EP2015/070430 filed on Sep. 8, 2015 in the name of Saint-Gobain Glass France. (English translation and German original) dated Nov. 24, 2015.

Written Opinion for International Application No. PCT/EP2015/070430 filed Sep. 8, 2015 on behalf of Saint-Gobain Glass France, dated Nov. 24, 2015. 12 pages. (English Translation + German Original).

Written Opinion for International Application No. PCT/EP2015/070432 filed Sep. 8, 2015 on behalf of Saint-Gobain Glass France, dated Dec. 7, 2015. 14 pages. (English Translation + German Original).

Office Action and Search Report as issued in Chinese Patent Application No. 201580021087.3, dated Jul. 16, 2018.

* cited by examiner

A – A' a) 
b) 
c) 
d) 
e) 
f) 
g) 
h) 
i)

TOOL FOR A GLASS-BENDING PROCESS

CROSS REFERENCE TO RELATED APPLICATIONS

The present application is the U.S. national stage entry of International Patent Application No. PCT/EP2015/070430, filed internationally on Sep. 8, 2015, which, in turn, claims priority to European Patent Application No. 14190619.8, filed on Oct. 28, 2014.

The invention relates to a tool for a glass bending process, a method for bending glass panes, and the use of the tool.

In the motor vehicle sector, bent composite glazings are common, in particular as windshields. It is known that it is advantageous to bend the individual panes of the composite glazing together simultaneously. Glass panes bent in pairs are matched with each other in terms of their curvature and are, consequently, especially suitable for laminating with one another to form the composite glazing. A method for paired bending of glass panes is known, for example, from DE 101 05 200 A1.

EP 1 836 136 B1 discloses another bending method as well as a generic tool, referred to there as "upper mold" (forme supérieure). The convex tool is used as the upper mold in a bending process and is suitable for holding the glass panes to be bent against the influence of gravity. The holding tool comprises a frame-like, convex contact surface and a cover having a peripheral air guide plate. By means of suction along the pane edges, the glass pane to be bent is pressed against the action of gravity against the contact surface and, thus, securely held on the tool. Even two glass panes lying one atop the other can be simultaneously held in the tool. The tool can be used to transport the glass panes between various positions of the bending device, for example, to pick up the glass panes from one bending mold and to transfer them to another. The tool can also be used for a press bending step, in which the glass panes are shaped between the tool and a complementary counter mold under the action of pressure and for suction.

In the method described in EP 1 836 136 B1, the glass panes are pre-bent on a first lower mold by sag bending. The glass panes are then picked up by the generic holding tool from the first lower bending mold and transported to a second lower bending mold. Between the holding tool and the second lower bending mold, the glass panes obtain their final shape in a press bending step before they are again transferred by the generic holding tool to a lower mold for cooling.

U.S. Pat. No. 3,778,244 A discloses an upper bending tool with a concave or convex full-surface contact surface (full mold) and a cover having a peripheral air guide plate. By means of the air guide plate, the edge of the glass pane to be bent can be swept with a stream of air such that the glass pane is pressed against the contact surface. In addition, the glass pane can be sucked there against through openings in the full-surface contact surface. The tool and the suction are not intended to hold the glass pane against the tool; instead, active deformation of the glass pane is intended to be achieved.

Modern motor vehicle glazings have increasingly complex shapes with very pronounced radii of curvature in regions. At the time of the picking up of the glass panes by the convex holding tool, suction that works against the direction of curvature of the glass panes is exerted on the panes. There is, consequently, the risk that a curvature produced is reduced as a result of the suction during the holding of the glass panes. There is, consequently, a need for new bending tools, which overcome this disadvantage and with which, in particular, highly curved panes can be produced with high-quality and in a manner reasonable from the standpoint of process technology.

The object of the present invention is to provide such an improved bending tool. The bending tool should, in particular, be suitable for holding glass panes against the action of gravity, without the bend in the panes being reduced by suction.

The object of the invention is accomplished according to the invention by a tool in accordance with claim 1. Preferred embodiments are apparent from the subclaims.

The tool according to the invention for holding at least one glass pane by means of suction in a bending process comprises a frame-like, convex contact surface and a cover having a peripheral air guide plate that surrounds the contact surface at least in regions, wherein the tool is suitable for generating a first, reduced pressure $p_1$ (holding pressure) in a first pressure region between the air guide plate and the contact surface;

a second pressure $p_2$ (compensation pressure) in a second pressure region, wherein the second pressure $p_2$ is greater than the first pressure $p_1$.

The pressures $p_1$ and $p_2$ indicated here are generated, in particular, on the tool-facing surface of the glass pane to be held.

As is specified more precisely in the following, the glass panes are securely held against the bending tool by the first pressure region, with the suction acting, in particular, on the pane edges. In the second pressure region, a weaker suction or none at all is present such that undesirable effects on the pane shape, in particular. In the central region of the pane, can be avoided. These are major advantages of the present invention.

The tool according to the invention belongs to the group of tools with which at least one glass pane is held by suction. The tool according to the invention enables, during a bending process, the holding of the glass pane to be bent against the influence of gravity, in that suction produced by a vacuum is exerted on the glass pane and distributed in a defined manner by the bending tool such that the glass pane is pressed against the tool as a result of suction. The tool can also be referred to as a suction mold.

The tool according to the invention for holding at least one glass pane by means of suction includes a frame-like contact surface. It is thus not a so-called "full-surface tool", in which the glass pane is brought with its full surface into contact with a mold surface. Instead, it belongs to the group of tools wherein a peripheral region of the glass pane on the side edges or in the vicinity of the side edges is in direct contact with the tool, whereas most of the pane has no direct contact with the tool. Such a tool can also be referred to as a ring (holding ring, bending ring) or frame (frame mold). In the context of the invention, the term "frame-like contact surface" serves only to distinguish the tool according to the invention from a full-surface mold. The contact surface need not form a complete frame, but can also be discontinuous. The contact surface is implemented in the form of a complete or discontinuous frame.

The width of the contact surface is preferably from 0.1 cm to 10 cm, particularly preferably from 0.2 cm to 1 cm, for example, 0.3 cm.

The tool is further equipped with a so-called "skeleton", which means a flat structure which bears the contact surface. The skeleton is implemented with the contact surface. The contact surface is arranged on the skeleton.

The tool according to the invention is a so-called "convex tool". This means that the contact surface is implemented convex. The term "convex shape" means a shape in which the corners and edges of the glass pane are bent in the intended contact with the tool closer in the direction of the tool than the center of the pane.

The tool according to the invention further includes a cover. The cover is arranged on the side of the contact surface facing away from the glass pane during the holding or bending procedure. The cover enables the generation of the suction essential for the holding procedure. The suction is generated in particular by extracting the air between the cover and the bending skeleton.

The cover is implemented with a peripheral air guide plate surrounding the contact surface at least in regions. Such an air guide plate is frequently also referred to as an skirt. The air guide plate is preferably arranged on the end of the cover. The air guide plate surrounds or frames the contact surface completely or in sections. During the holding procedure, the air guide plate preferably has a distance from the side edges of the glass pane of 3 mm to 50 mm, particularly preferably of 5 mm to 30 mm, for example, 20 mm.

The bending tool according to the invention is suitable for generating, in at least a first pressure region, a first, reduced pressure $p_1$. In the context of the invention, "reduced pressure" means a pressure that is less than the ambient pressure. With a reduced pressure, a vacuum relative to the ambient pressure is thus present. Suction is obtained by means of the reduced pressure. The region in which the first pressure $p_1$ acts, is referred to, in the context of the invention, as the first pressure region. The first pressure region is arranged between the air guide plate and the contact surface. The first pressure region is preferably a single, contiguous, frame-like region. The first pressure region can, however, also consist of a plurality of sections with the same pressure separated from one another.

The first pressure region is suitable for sweeping the edge of the glass pane to be held, at least in sections, with a stream of air and thus pressing the glass pane against the contact surface. The stream of air generated by the first pressure $p_1$ is deflected by the air guide plate such that the side edges of the glass pane are swept at least in sections. By means of the stream of air, the glass pane is effectively held against the bending tool and pressed against the contact surface. Thus, the bending tool can be used in particular as the upper mold in a bending process, wherein the glass pane is held against the tool against the action of gravity by the stream of air sweeping the edge. The first pressure $p_1$ can also be referred to as holding pressure.

The term "an upper mold" means a mold that contacts the upper surface of the glass pane facing away from the ground. "A lower mold" means a mold that contacts the lower surface of the glass pane facing the ground. The glass pane can be placed on a lower mold.

Even a plurality, for example, two glass panes lying one atop the other can be held simultaneously by the tool according to the invention. The tool is thus particularly suited for methods of paired bending, in which two individual panes that are intended to be laminated later to form a composite glazing can be simultaneously bent congruently together.

The tool according to the invention is preferably provided with a suction pipe with which suction can be generated. The suction pipe is preferably arranged on the side of the tool facing away from the contact surface. The first pressure region is connected to the suction pipe such that air is extracted from the first pressure region, by which means the first pressure $p_1$ is generated.

The bending tool according to the invention is further suitable for generating, in at least a second pressure region, a second pressure $p_2$. The second pressure $p_2$ is, according to the invention, greater than the first pressure $p_1$ (in other words, the vacuum is less strong in the second pressure region than in the first pressure region) such that the suction generated by the pressure $p_2$ is lower than the suction generated by the pressure $p_1$. The second pressure $p_2$ can correspond to the ambient pressure such that no vacuum and thus no suction is present in the second pressure region. Since, in the second pressure region, a lower suction or no suction at all is exerted on the glass panes, undesirable effects on the pane bending, in particular a reduction in a previously generated curvature, can be effectively prevented. The second pressure $p_2$ can also be referred to as compensation pressure.

In a preferred embodiment, the second pressure region is arranged in a central region of the tool inside the contact surface. This means that the second pressure region is surrounded by the frame-like contact surface. The second pressure region is suitable for exerting a weaker suction on the central region of the glass pane to be held than on the pane edges.

The tool is preferably suitable for holding the glass pane without bending it.

In an advantageous embodiment, the tool is provided with at least one vent pipe, which enables complete or partial pressure equalization between the surroundings and the second pressure region. Air is entrained from outside through the vent pipe. The second pressure $p_2$ can thus be increased relative to the first pressure $p_1$.

The vent pipe is provided, in a preferred embodiment, with a valve for regulating the flow. By this means, the second pressure $p_2$ can be actively regulated.

The second pressure region can be connected to the above-described suction pipe for the first pressure region, by which means the higher second pressure $p_2$ is reached through the suitable design of the conduit cross-section and/or at least one vent pipe. The second pressure region can, alternatively, also have its own suction pipe.

The object of the invention is further accomplished by a method for bending at least one glass pane, which includes at least one holding step, wherein a tool according to the invention is used as an upper mold and wherein the glass pane is held, by the stream of air of the first pressure region sweeping the edge, against the tool against the influence of gravity.

During the holding step, the shape of the glass pane is preferably not changed. The holding by the tool according to the invention thus occurs without further bending of the glass pane. The glass pane is merely securely fixed against the tool. The tool is particularly suitable for such a pure holding step; undesirable bends in the central region can be effectively prevented by the second pressure region according to the invention. However, the tool can, in addition to the holding step, also be used as an upper mold in a press bending step, wherein the deformation of the glass pane is done not by the upper tool alone, but, instead, through the influence of the complementary lower tool.

Alternatively, in an improvement of the invention, another bending action can be associated with the suction of the glass pane on the tool. This can, for example, be accomplished by a suitable shaping of the contact surface such that the glass pane clings, as a result of the suction, to the contact surface and is thus bent. The tool then acts simultaneously as a holding tool and a bending tool.

The method is, in a particularly preferred embodiment, the method that is described in detail in EP 1 836 136 B1, wherein the tool according to the invention is used instead of the upper mold ("forme supérieure 11") described there. The method is preferably performed using the device that is described in detail in EP 1 836 136 B1, wherein, likewise, the tool according to the invention is used instead of the upper mold ("forme supérieure 11") described there.

Preferably, the glass pane is first heated to bending temperature and pre-bent on a first lower mold. Typically, the glass pane, flat in the initial state, is positioned on the first lower mold. The first lower mold is typically implemented movable, for example, mounted on a carriage and passes through a furnace for heating, with the glass pane being heated to bending temperature. Here, the term "bending temperature" means a temperature at which the glass pane is sufficiently softened to be able to be deformed. Typical bending temperatures are from 500° C. to 700° C., preferably from 550° C. to 650° C. The first lower mold is preferably a concave mold complementary to the tool according to the invention. The first lower mold is particularly suitable for sag bending. By means of heating to bending temperature, the glass pane is softened and clings under the effect of gravity to the first lower bending mold. The glass pane is thus pre-bent using sag bending, before it is further bent by additional process steps.

After pre-bending, the glass pane is picked up by the tool according to the invention from the first lower mold. The tool according to the invention is brought into proximity with the glass pane from above, which can be achieved by a horizontal movement of the tool and/or the first lower mold according to the invention. The bending tool according to the invention thus acts as an upper mold. At a sufficiently small distance, the glass pane is sucked against the tool by the suction of the first pressure region and is held thereby. The glass pane is brought into contact with the contact surface such that the edge of the glass pane is swept at least in sections by a stream of air generated by the first reduced pressure p1. For this, the edge of the glass pane is preferably arranged, at least in sections, in the first pressure region. The glass pane is thus taken over by the tool according to the invention from the first lower mold. In the further process, the glass pane is transferred to another (lower) mold by the tool according to the invention.

Preferably, the glass pane is, after the pre-bending and the takeover by the tool according to the invention, subjected to a press bending step between the tool according to the invention and a second lower mold. The deformation of the glass pane is done by pressure and/or suction of the two complementary bending tools. The second lower mold is preferably implemented concave and solid and provided with openings. Preferably, through the openings of the second lower mold, suction suitable for further deforming the glass pane is exerted on the glass pane. During the press bending, the glass pane is fixed between the molds such that the suction of the upper mold can be switched off. In this case, after the separation of the molds, the glass pane remains in the lower mold.

The glass pane is preferably transferred after press bending from the tool according to the invention to another lower mold, on which it cools. The same mold or a mold designed identical to the first lower bending mold (sag bending mold) can be used as the other lower mold.

It is possible to use two different tools according to the invention for the takeover of the glass pane from the first lower mold (pre-bending mold) and for the transfer of the glass pane from the second lower mold (press bending mold) to the holding mold for cooling. The two tools according to the invention can, for example, have a differently designed contact surface, which takes into account the different shape of the pane in the various process phases. The two tools can, however, also be designed identically, wherein the use of two tools can have process-technology advantages, for example, with regard to cycle time, as described in EP 1 836 136 B1.

In an advantageous embodiment, the method is applied simultaneously to at least two, preferably two panes lying one atop the other. The glass panes are simultaneously bent pairwise (i.e., as a pair of panes). The bending of the two glass panes is then particularly congruent and coordinated with one another such that the panes are particularly suitable for being laminated to one another to form a composite glass of high optical quality.

The bending tool according to the invention is used as an upper mold. By means of the stream of air sweeping the edge of the glass pane in the first pressure region, which is generated by the first, reduced pressure, the glass pane can be reliably held against the bending tool against the action of gravity. The first pressure region is also suitable for simultaneously holding a plurality of glass panes lying one atop the other.

The first pressure $p_1$ is, in a preferred embodiment, based on the ambient pressure, a vacuum from 1 mbar to 20 mbar, particularly preferably from 2 mbar to 10 mbar, most particularly preferably from 3 mbar to 6 mbar. If the ambient pressure is assumed to be approximately 1 bar (standard conditions), the first pressure $p_1$ is thus preferably from 980 mbar to 999 mbar, particularly preferably from 990 mbar to 998 mbar, most particularly preferably from 994 mbar to 997 mbar. Thus, sufficient suction is obtained along the pane edges such that the bending tool can be used as the upper bending mold. Glass panes, even a plurality of glass panes simultaneously, can advantageously be sucked and held against the bending tool.

The second pressure $p_2$ is, in a preferred embodiment, based on the ambient pressure, a vacuum from 0 mbar to 5 mbar, particularly preferably from 0 mbar to 2 mbar, most particularly preferably from 0 mbar to 1 mbar. There is thus, based on the ambient pressure, a vacuum of at most 5 mbar, particularly preferably at most 2 mbar, most particularly preferably at most 1 mbar. Thus, undesirable bending as a result of the suction can be effectively prevented. If the ambient pressure is assumed to be approximately 1 bar (standard conditions), the second pressure $p_2$ is thus preferably at least 995 mbar, particularly preferably at least 998 mbar, most particularly preferably at least 999 mbar. In an advantageous embodiment, the second pressure $p_2$ corresponds to the ambient pressure.

The glass pane or the glass panes preferably contain soda lime glass, but, alternatively, can also contain other types of glass such as borosilicate glass or quartz glass. The thickness of the glass panes is typically 0.5 mm to 10 mm, preferably 1 mm to 5 mm.

When two or more glass panes are bent simultaneously, a separation means is preferably arranged between the panes such that the panes do not permanently adhere to one another.

The tool according to the invention is preferably used as a tool in a bending process for glass panes in the motor vehicle sector, in particular for paired bending of the glass panes that are provided as components of a composite glazing. Such a composite pane is preferably a windshield, but can also be a roof pane, side pane, or rear pane.

In the following, the invention is explained in detail with reference to drawings and exemplary embodiments. The drawings are schematic depictions and not to scale. The drawings in no way limit the invention.

Figure 2:
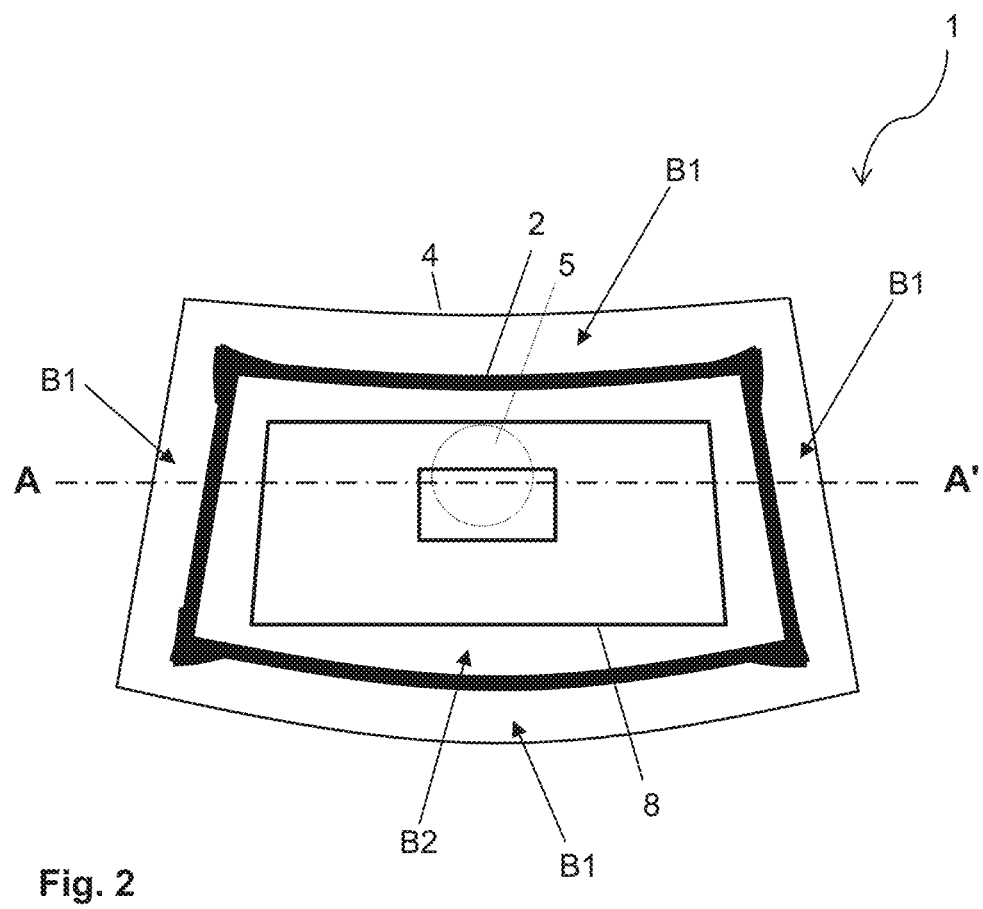
Figure 3:
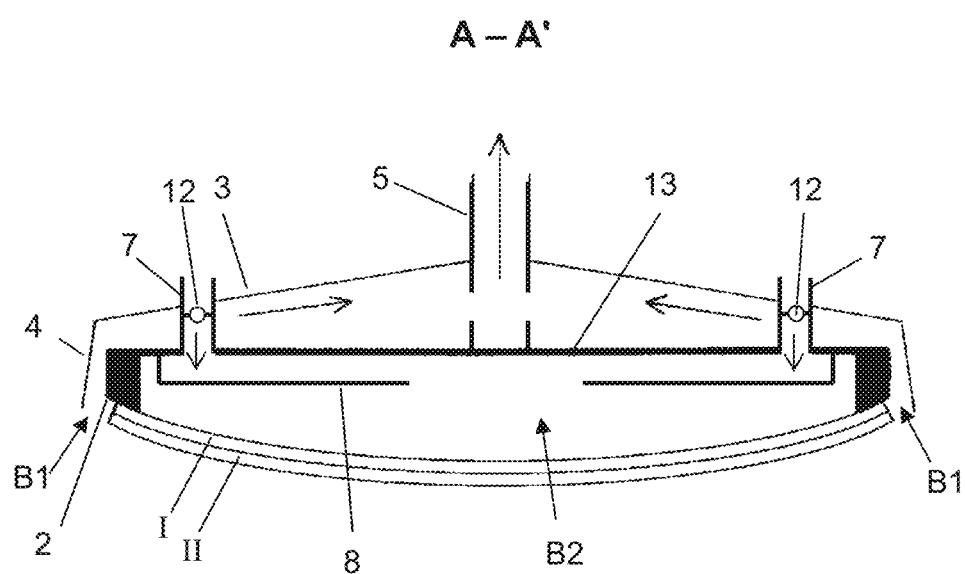
Figure 4:
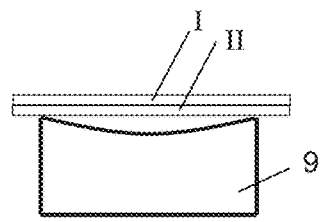
Figure 4:
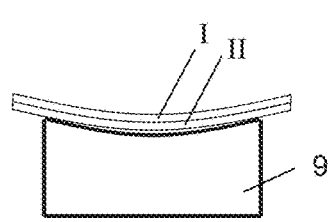
Figure 4:
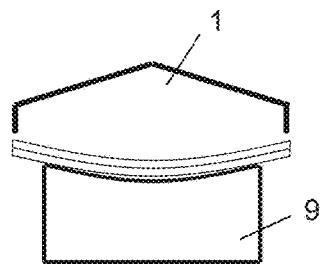
Figure 4:
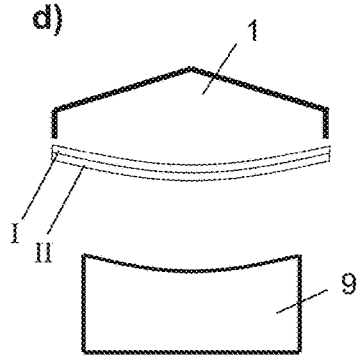
Figure 4:
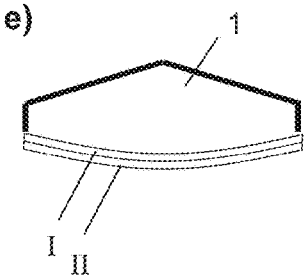
Figure 4:
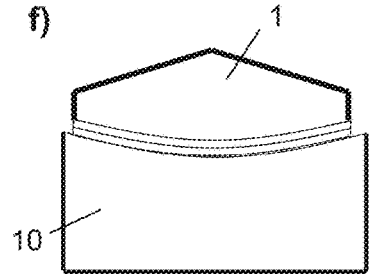
Figure 4:
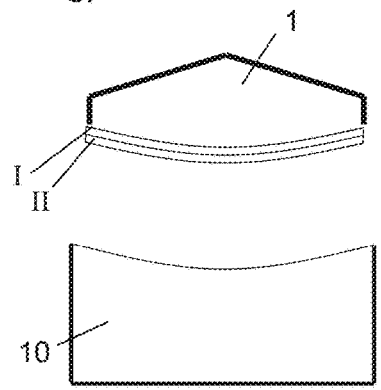
Figure 4:
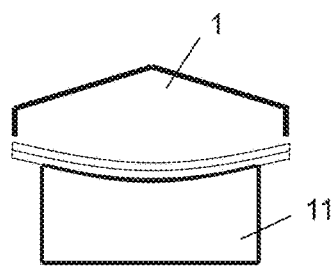
Figure 4:
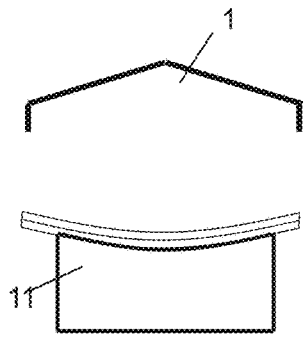
Figure 5:
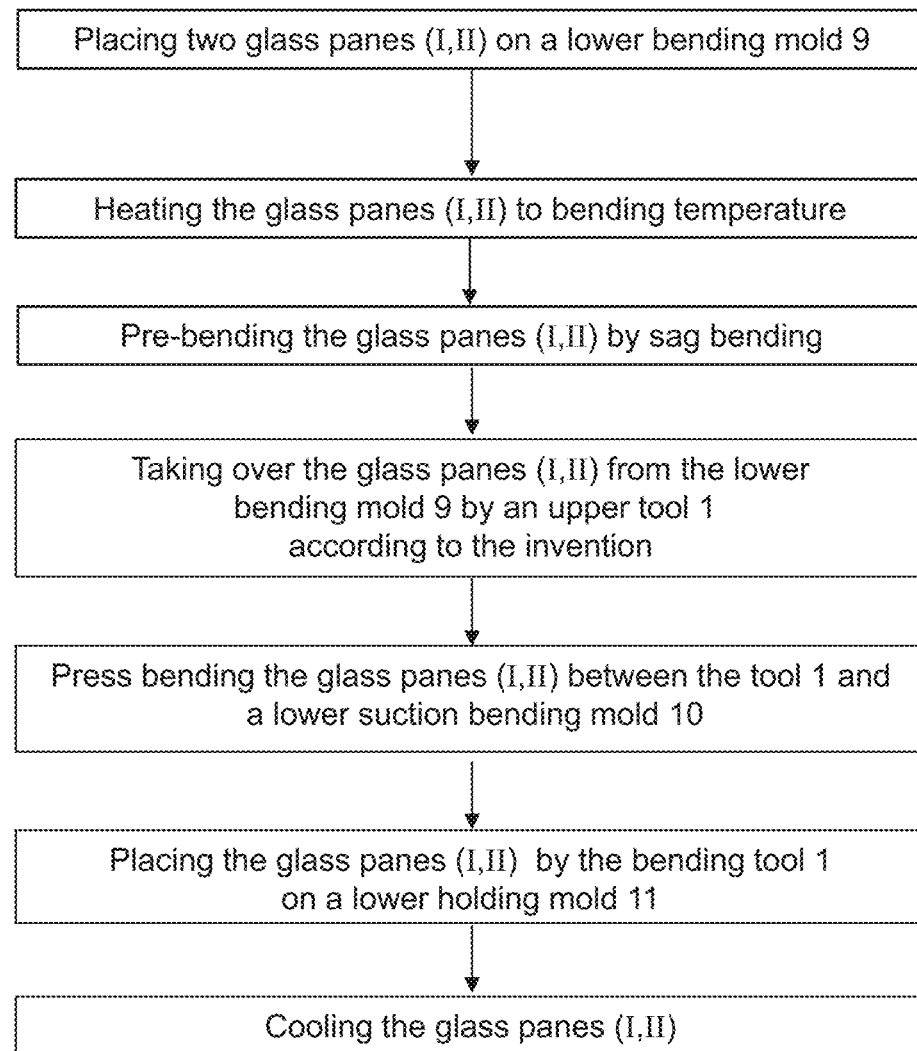

They depict:

FIG. 1 a cross-section through a generic bending tool according to the prior art, FIG. 2 a plan view of an embodiment of the bending tool according to the invention, FIG. 3 a cross-section along A-A' through the bending tool of FIG. 2, FIG. 4 a stepwise representation of an embodiment of the method according to the invention, and FIG. 5 a flowchart of an embodiment of the method according to the invention.

FIG. 1 depicts a tool for glass bending processes according to the prior art. The tool is an upper mold that is suitable for holding two glass panes I, II lying one atop the other against a frame-like, convex contact surface 2 by means of suction against the influence of gravity. The contact surface 2 is arranged on a so-called skeleton 13. For generating the suction, the tool includes a suction pipe 5, via which the air is extracted. The tool further has a cover 3, whose end is equipped with a peripheral air guide plate 4. The air guide plate 4 surrounds the contact surface 2 peripherally. By means of the bending skeleton 13 and the cover 3 with the air guide plate 4, the stream of air generated through the suction pipe is guided such that it sweeps the edges of the glass pane. Thus, the pair of glass panes I, II is securely held against the contact surface 2.

The panes I, II are pre-bent, for example, by sag bending in a lower bending mold. The tool depicted can, for example, be used, to pick up the pair of glass panes I, II out of the lower mold and to transfer it to another mold. For example, the pair of glass panes I, II can be subjected to a press bending process, wherein it is deformed between the tool depicted and a counter mold under the effect of pressure and/or suction.

The tool and bending method in which it can be used depicted are known from EP 1 836 136 B1, WO 2012/080071 A1, and WO 2012/080072 A1.

FIG. 2 and FIG. 3 each depict a detail of an improved tool 1 according to the invention. The tool 1 is like the tool in FIG. 1, an upper mold for a bending process. FIG. 2 depicts a plan view of the lower side of the tool 1 provided for contacting with the glass pane to be bent, whereas FIG. 3 depicts a cross-section.

The bending tool 1 has, like the tool of FIG. 1, a suction pipe 5 for generating suction, as well as a cover 3 with an air guide plate 4 and a bending skeleton 13 with a frame-like contact surface 2. In contrast with the known tool, the suction in the bending tool is selectively divided, by which means an optimized pressure distribution is produced.

The bending tool 1 has two different pressure regions B1 and B2, in which different pressures that act on the glass panes I, II can be generated. The first pressure region B1 is arranged peripherally roughly between air guide plate 4 and contact surface 2. The second pressure region B2 is arranged in the central region of the tool 1 surrounded by the contact surface 2 of the tool 1.

The tool 1 is suitable for generating, in the first pressure region B1, a first, reduced pressure $p_1$. The pressure $p_1$ results in an upwardly directed stream of air between air guide plate 4 and contact surface 2. When one or a plurality of glass panes I, II are in contact according to the invention with the bending tool 1, the side edges of the glass panes are swept by the stream of air. The stream of air is suitable for holding one or even a plurality of glass panes lying one atop another, against the action of gravity, against the contact surface of the tool 1. The first pressure $p_1$ in the first pressure region B1 thus fulfills the function of the stream of air in the tool according to the prior art of FIG. 1. A first pressure $p_1$, which corresponds, based on the ambient pressure, to a vacuum of 3 mbar to 6 mbar, is suitable for holding a pair of glass panes I, II each having a typical pane thickness of roughly 2.1 mm.

The tool 1 is further suitable for generating, in the second pressure region B2, a second pressure $p_2$, which is greater than the first pressure $p_1$. The suction is thus weaker in the second pressure region B2 than in the first pressure region B1. The second pressure region B2 prevents undesirable effects of suction on the pre-bending of the pane, in particular in its central region. As is discernible in the figure, a strong suction in the central region of the pane would counteract the pre-bending and the risk would exist that the pre-bending would be reduced thereby or even "counter-bending" would be generated in the central region. This can be effectively prevented by the tool according to the invention with the second pressure region B2. A typical second pressure $p_2$ corresponds, for example, roughly to the ambient pressure or is only slightly below it with a vacuum of, for example, 1 mbar.

A vacuum in the suction pipe 5 that is suitable for being divided among the pressure regions as described above is, for example, roughly 80 mbar.

The tool 1 has a suction pipe 5 for generating the vacuums. The suction pipe 5 is arranged on the side of the tool 1 facing away from the contact surface 2, i.e., the top. The pressure regions B1 and B2 are connected to the suction pipe, by which means a reduced pressure is generated. The cover 3 and the skeleton 13 bearing the contact surface 2 form a conduit between the first pressure region B1 and the suction pipe 5. The suction pipe 5 is actually not discernible in the plan view of FIG. 2; however, its position is indicated by a dotted line.

The second pressure region B2 has a connection (not shown in the figures) to the suction pipe 5, by means of which a reduced pressure is also generated in the second pressure region B2. The tool 1 has vent pipes 7 for increasing the second pressure $p_2$. The vent pipes 7 run between the skeleton 13 and the cover 3 and connect the second pressure region B2 to the surroundings on the side of the tool 1 facing away from the contact surfaces 2. The second pressure $p_2$ results from the suction of the suction pipes 5 and the air entrained through the vent pipes 7. The vent pipes 7 are provided with valves 12 for active regulation of the second pressure $p_2$. The entrained air is indicated in the figures by arrows.

The skeleton 13 is provided with a deflector plate 8, which has a central opening. The deflector plate 8 deflects the air entrained through the vent pipes 7 such that it flows roughly centrally into the second pressure region B2. By this means, a homogeneous dispersion is achieved, which is advantageous for the surface of the glass pane. A centrally mounted central vent pipe is not possible in the embodiment depicted since the space needed for it is occupied by the central suction pipe 5.

FIG. 4 schematically depicts the steps of an embodiment of the method according to the invention. First, two glass panes I, II lying one atop the other, which are flat in the initial state, are positioned on a lower bending mold 9 (Part a). The panes on the bending mold 9 are heated to bending temperature, for example, 600° C., and and cling as a result of gravity to the shape of the lower bending mold 9 (Part b). The glass panes I, II are thus pre-bent by sag bending. After the sag bending, the glass panes I, II are taken over by the tool 1 according to the invention. To that end, the tool 1 is brought into proximity with the glass panes I, II on the lower bending mold 9 from above and brought into contact with the contact surface 2 (Part c). Then, suction is generated via the suction pipe 5. Due to the first pressure $p_1$, the glass panes I, II are held against the bending tool 1 and can be moved upward by it and thus removed from the lower bending mold 9 (Part d). The second pressure $p_2$ prevents bending defects in the center of the pane. After the glass panes were taken over by the bending tool 1 (Part e), a lower suction bending mold 10 is brought into proximity with the glass panes I, II from below. The glass panes I, II are bent between the tool 1 according to the invention and the lower suction bending mold 10 by press bending into their final shape (Part f). The lower suction bending mold 10 is then lowered again (Part g) and the glass panes I, II are placed by means of the bending tool 1 on a lower holding mold 11 and transferred to this holding mold 11 by turning off the suction (Part h). The bending tool 1 is then moved upward (Part i) and is ready for the bending process of the next pair of panes. On the lower holding mold 11, the glass panes I, II cool to the ambient temperature. The same mold or a mold designed the same as the first lower bending mold 9 (sag bending mold) can be used as the lower holding mold 11.

The process steps schematically depicted here mirror the method described in greater detail in EP 1 836 136 B1, wherein the upper mold used there ("forme supérieure 11") has been replaced by the tool according to the invention 1.

FIG. 5 depicts the exemplary embodiment of FIG. 4 using a flowchart.

LIST OF REFERENCE CHARACTERS (1) tool according to the invention for holding at least one glass pane
(2) frame-like contact surface
(3) cover
(4) air guide plate
(5) suction pipe
(7) vent pipe
(8) deflector plate
(9) first lower bending mold/sag bending mold
(10) second lower bending mold/suction bending mold
(11) lower holding mold
(12) valve of 7
(13) skeleton of 1
(B1) first pressure region
(B2) second pressure region
($p_1$) first, reduced pressure
($p_2$) second pressure
(I) glass pane
(II) glass pane

The invention claimed is:

1. A tool for holding at least one glass pane by means of suction in a bending process, the tool comprising a frame-like, convex contact surface and a cover having a peripheral air guide plate that surrounds the convex contact surface at least in regions the bending tool constructed and arranged to contact a peripheral portion of a main surface of the glass pane such that a majority of the main surface of the glass pane is without contact with the bending tool during bending of the glass pane by the bending tool such that the convex contact surface contacts said peripheral portion of the main surface of the glass pane, the majority of the main surface of the glass pane being without contact with the bending tool; wherein the tool is configured to generate:
   a first, reduced pressure in a first pressure region between the peripheral air guide plate and the convex contact surface, and
   a second pressure in a second pressure region the second pressure region being in a central region inside the convex contact surface, wherein the second pressure is greater than the first pressure.

2. The tool according to claim 1, wherein the tool is further configured to hold the glass pane without bending it.

3. The tool according to claim 1, wherein the tool is further configured to generate the first pressure region for suctioning an edge of the glass pane, thereby pressing the glass pane against the convex contact surface.

4. The tool according to claim 1, further comprising a suction pipe connected to the first pressure region.

5. The tool according to claim 1, further comprising at least one vent pipe connecting the second pressure region with air surrounding the tool.

6. The tool according to claim 5, wherein the vent pipe comprises a valve for regulating air flow.

7. A method for bending at least one glass pane, the method comprising:
   providing a tool comprising a frame-like, convex contact surface and a cover having a peripheral air guide plate that surrounds the convex contact surface at least in regions; the bending tool constructed and arranged to contact a peripheral portion of a main surface of the glass pane such that a majority of the main surface of the glass pane is without contact with the bending tool during bending of the glass pane by the bending tool such that the convex contact surface contacts said peripheral portion of the main surface of the glass pane, the majority of the main surface of the glass pane being without contact with the bending tool;
   positioning the tool above the glass pane;
   generating a first, reduced pressure in a first pressure region between the peripheral air guide plate and the convex contact surface, and
   generating a second pressure in a second pressure region the second pressure region being in a central region inside the convex contact surface, wherein the second pressure is greater than the first pressure; and
   holding the glass pane against gravity by forces due to the first, reduced pressure.

8. The method according to claim 7, wherein the holding of the glass pane is without bending the glass pane.

9. The method according to claim 7, further comprising: heating the glass pane to a bending temperature; pre-bending the glass pane on a first lower mold;
   picking up the glass pane from the first lower mold by the tool; and transferring the glass pane to another mold.

10. The method according to claim 9, further comprising, after the pre-bending, bending the glass pane between the tool and a concave second lower mold by press bending.

11. The method according to claim 10, wherein the second lower mold is solid and comprises openings and further comprising suctioning, through the openings of the second lower mold, thereby further deforming the glass pane.

12. The method according to claim 11, further comprising transferring the glass pane, after press bending, onto a lower holding mold for cooling.

13. The method according to claim 7, further comprising simultaneously bending two glass panes lying one atop the other as a pair.

14. The method of claim 13, wherein the two glass panes are components of a laminated glass.

15. The method of claim 14, wherein the laminated glass is a windshield.

16. The method according to claim 7, wherein the first pressure is between 1 mbar and 20 mbar and the second pressure is between 0 mbar and 5 mbar.

17. The method of claim 16, wherein the first pressure is between 2 mbar and 10 mbar and the second pressure is between 0 mbar and 2 mbar.

* * * * *